(12) United States Patent
Leyton et al.

(10) Patent No.: US 12,530,853 B2
(45) Date of Patent: Jan. 20, 2026

(54) IDENTIFYING DEVICES IN A MIXED-REALITY ENVIRONMENT

(71) Applicant: Sony Interactive Entertainment Europe Limited, London (GB)

(72) Inventors: Pedro Federico Quijada Leyton, London (GB); David Erwan Damien Uberti, London (GB); Lloyd Preston Stemple, London (GB); Aron Giuseppe Visciglia, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 224 days.

(21) Appl. No.: 18/222,981

(22) Filed: Jul. 17, 2023

(65) Prior Publication Data
US 2024/0029365 A1     Jan. 25, 2024

(30) Foreign Application Priority Data
Jul. 25, 2022   (GB) ..................................... 2210865

(51) Int. Cl.
| | |
|---|---|
| G06T 19/00 | (2011.01) |
| G02B 27/01 | (2006.01) |
| G06T 7/70 | (2017.01) |
| G06V 10/20 | (2022.01) |
| G06V 10/82 | (2022.01) |

(52) U.S. Cl.
CPC .......... *G06T 19/006* (2013.01); *G02B 27/017* (2013.01); *G06T 7/70* (2017.01); *G06V 10/255* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 11,526,990 | B1* | 12/2022 | Tamir | G06V 10/764 |
| 2011/0103353 | A1* | 5/2011 | Boda | G06F 3/04883 |
| | | | | 370/338 |
| 2013/0307766 | A1* | 11/2013 | Amathnadu | G06F 3/017 |
| | | | | 345/156 |
| 2014/0274357 | A1* | 9/2014 | Nguyen | G07F 17/3211 |
| | | | | 463/29 |
| 2015/0036875 | A1* | 2/2015 | Savransky | G06V 20/20 |
| | | | | 382/103 |

(Continued)

FOREIGN PATENT DOCUMENTS

| | | |
|---|---|---|
| EP | 4 312 108 A1 | 1/2024 |
| WO | 2018148076 A1 | 8/2018 |

OTHER PUBLICATIONS

Extended European Search Report received in corresponding EP Application No. 23186616.1, dated Dec. 4, 2023, in 10 pages.

(Continued)

*Primary Examiner* — Martin Mushambo
(74) *Attorney, Agent, or Firm* — Kilpatrick Townsend & Stockton LLP (57) ABSTRACT

A computer-implemented method includes identifying a gaming device in a real-world environment, the gaming device providing a user experience to a user in a mixed-reality setting, identifying an object in the real-world environment in proximity to the gaming device, and initiating an activity relating to the object based on a virtual part of the mixed-reality setting.

18 Claims, 7 Drawing Sheets

(56) References Cited

U.S. PATENT DOCUMENTS

| | | | |
|---|---|---|---|
| 2018/0144209 A1* | 5/2018 | Kim | G06N 3/04 |
| 2019/0034765 A1 | 1/2019 | Kaehler et al. | |
| 2019/0036726 A1 | 1/2019 | Irving, Jr. | |
| 2020/0081754 A1* | 3/2020 | Booth | G06F 21/606 |
| 2020/0265836 A1* | 8/2020 | Kar | G10L 15/22 |
| 2020/0334448 A1* | 10/2020 | Ghazaryan | G06V 10/82 |
| 2021/0150818 A1* | 5/2021 | Dedonato | G06F 3/011 |
| 2021/0383579 A1* | 12/2021 | Lam | G06V 10/764 |
| 2021/0405959 A1* | 12/2021 | Lovitt | G06F 3/165 |
| 2022/0022967 A1* | 1/2022 | Nijhof | A61B 6/487 |
| 2022/0023752 A1* | 1/2022 | Price | A63F 13/211 |
| 2022/0153227 A1* | 5/2022 | Srivastava | B60R 25/31 |
| 2022/0349704 A1* | 11/2022 | Burke | G01S 5/0036 |
| 2023/0118831 A1* | 4/2023 | Zhang | G06V 10/82 |
| | | | 701/450 |

OTHER PUBLICATIONS

UK IPO Combined Search and Examination Report received in Application No. GB2210865.8, date of search Jan. 26, 2023, in 6 pages.
EP23186616.1, "Office Action", Oct. 15, 2025, 9 pages.
Sherstyuk, et al., "Virtual Roommates: Sampling and Reconstructing Presence in Multiple Shared Spaces", In: Handbook of Augmented Reality, Jan. 2011, 19 pages.

\* cited by examiner

IDENTIFYING DEVICES IN A MIXED-REALITY ENVIRONMENT

CROSS-REFERENCE TO RELATED APPLICATIONS

This application claims priority to United Kingdom Patent Application No. GB2210865.8, filed Jul. 25, 2022, the contents of which are incorporated herein by reference.

FIELD

The present disclosure relates to a computer-implemented method for identifying and reacting to the detection of a computing device and other objects in an augmented reality (or mixed-reality) environment.

BACKGROUND

In mixed-reality, the real world and the virtual world work together to create an augmented reality (mixed-reality) environment. It is desirable to create a seamless transition between the virtual and real-world parts of the environment that a user is experiencing.

Images are displayed virtually, which may overlap or coincide with the real-world. This can include, for example, displaying virtual objects (e.g. three dimensional interactive images) on tabletops, walls, chairs and floors of the real-world environment.

Objects or devices external to display screens can be part of the virtual display within the mixed-reality setting. The extent to which the real and virtual parts interact can be controlled to provide the best experience for a user.

SUMMARY

Aspects of the invention are set out in the independent claims, further features according to embodiments are set out in the dependent claims.

According to a first aspect, there is provided a computer-implemented method. According to a first step, the method may comprise identifying a gaming device in a real-world environment, the gaming device providing a user experience to a user in a mixed-reality setting. The method may further comprise identifying an object in the real-world environment in proximity to the gaming device and initiating an activity relating to the object based on a virtual part of the mixed-reality setting. The object may be in close proximity to the gaming device, for example. The gaming device may be a computing device such as a games console or a computer, or a screen (e.g. a television screen or computer monitor) which is connected to a computing device.

Advantageously, the method provides a way to prioritise extending the mixed-reality experience beyond the gaming device within a proximity of the gaming device. The system can automatically identify objects and initiate activities relating to the object, without having to rely on a user to identify where objects are in the environment or how to interact with them. By first identifying the gaming device, the experience is grounded in an area in proximity to the gaming device. Overall, this can help to improve a user's experience of the mixed-reality environment. Specifically, the activity which is initiated may be better incorporated to the user's experience within the environment.

A further advantage of identifying the gaming device first and grounding the experience thereto is that the gaming device is not usually subject to being moved within an environment and is larger and less prone to being observed in unusual orientations (e.g. compared to a controller). Therefore, the gaming device can be more easily and/or reliably identified and/or tracked in low-light environments, for example. The process of identifying the gaming device is therefore simplified the which may reduce processing, for example the next time the method is performed such as the next time a user uses the mixed-reality device. Once identified, there is no need to re-detect and identify at the start of every experience as the gaming device (e.g. games console) does not move often, so the re-scan can be triggered by user input.

In some embodiments, the activity may comprise a spawning process. A spawning process in computing refers to a function that loads and executes a new child process. The current process may execute concurrently with the child process or may wait for the child process to terminate before continuing. The child process in the context of the present disclosure may include generating an image to be displayed in the mixed-reality environment. Specifically, spawning may refer to the instantiation of a new virtual object to be introduced to the mixed-reality environment.

In some embodiments, the activity may comprise generating an image to be displayed to the user in the mixed-reality setting. The image may be a graphical overlay designed to augment and enhance the user's view of the mixed-reality environment. For example, the image may indicate (e.g. by highlighting) the gaming device and/or the object to the user. In some examples, different appliances may be highlighted (e.g. using different colours) to classify spaces in the environment.

In some embodiments, the activity may be initiated if the proximity of the object to the gaming device is below a predetermined threshold. This may be determined at an initial detection and identification stage. Some objects may have different thresholds depending, for example, on user interaction, size, play space (room/environment) dimensions, etc. Optionally, wherein the predetermined threshold is up to 10 meters, preferably wherein the predetermined threshold is up to 5 meters. This ensures that the activity is initiated in reasonably close proximity to the gaming device such that the user can interact with the activity close to them, for example helping to define a player playing space in a gaming context. In other examples, the activity may be initiated if the proximity of the object is within a range of the gaming device where the predetermined threshold may be specified, for example, by a local area network (LAN) or a Wi-Fi range, for example.

In some embodiments, the activity can be initiated if the object is within a same room in a building as the gaming device. This prevents activities being initiated in areas which are out of reach of a user's view of the environment although they may be geographically close to the gaming device.

In some embodiments, the object may be a further gaming device. The further gaming device may include a screen such as a television screen or computer monitor, a gaming chair or gaming table.

In some embodiments, identifying the gaming device and/or the object can be based on scanning the local environment, local to the gaming device. Optionally, scanning the local environment further comprises determining planes (e.g. surfaces or types of plane). The planes may include areas of the environment which will become playing areas. Determining planes is optionally performed using simultaneous location and mapping, SLAM. In some examples, scanning may be performed through a lens (e.g. camera) on a headset of a user in the environment. Optionally, data may be measured by the headset and sent to a central processor for processing to determine the planes/surfaces.

In some embodiments, identifying the gaming device and/or determining the object comprises using a trained artificial neural network, ANN, or a convolutional neural network, CNN.

In some embodiments, identifying comprises receiving information concerning the gaming device and/or the object. Information may be retrieved from a memory, for example, or directly communicated to the system by the object if it is a smart device having communications capabilities. Optionally, the information is sent via a communications network, for example a wireless communications network. The information may be received at a headset of the user, or by the gaming device.

In some embodiments, the gaming device is a screen or a games console.

In some embodiments, the method may further comprise storing location and/or position information relating to the gaming device and/or the one or more features. This may remove the need to scan or review the environment again, which may save processing power.

In some embodiments, the method may further comprise indicating the gaming device and/or the object to a user via a display device. This may include highlighting the gaming device to the user.

In some embodiments, the method may further comprise: identifying a second gaming device in a second real-world environment, identifying a second object in the second real-world environment in proximity to the second gaming device, and initiating the activity relating to the first and second objects based on the virtual part of the mixed-reality setting. As such, the method may be performed between multiple users in different environments.

In some embodiments, further comprising comparing the first and second real-world environments and initiating the activity based on the comparison. This helps to ensure that users in multiple environments share a consistent experience between themselves.

According to a second aspect, there is provided a computer program product including one or more executable instructions which, when executed by a computer, causes the computer to carry out the method according to the first aspect.

According to a third aspect, there is provided a system comprising a mixed-reality display device and a gaming device comprising a processor and memory, wherein the gaming device and the mixed-reality display device are operably connected by a communication network, and wherein the system is arranged and configured to carry out the method of the first aspect. Optionally, wherein the gaming device is a computing device.

In some examples, the gaming device may be a TV, a computer monitor or a games console; and/or
the mixed-reality display device may be an Augmented Reality, AR, headset.

BRIEF DESCRIPTION OF DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Figure 1:
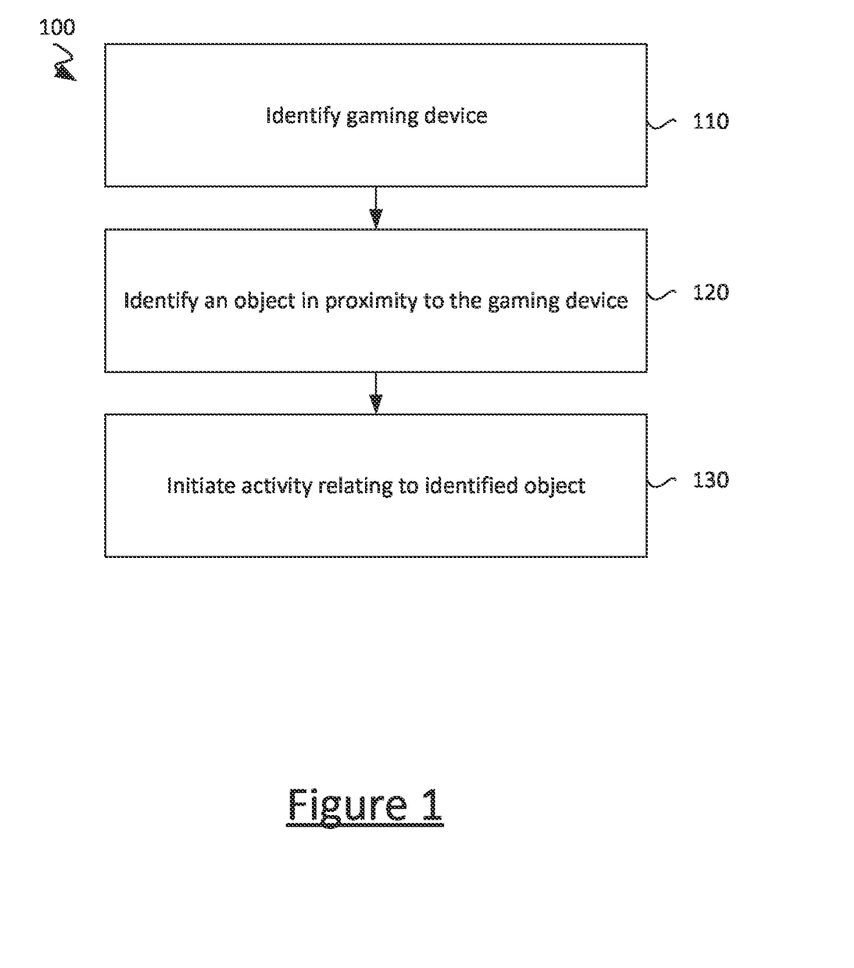
FIG. 1 illustrates a flow diagram of a method according to an embodiment of the disclosure.

FIG. 1 illustrates a flow diagram of a computer-implemented method 100 according to an embodiment of the present disclosure.

According to a first step 110, a gaming device is identified in an environment. The gaming device may be a screen, such as a television screen or computer monitor, or a games console. The environment may be a room, for example. In some embodiments, there may be multiple users. In this instance, a gaming device is identified in each of the users' environments.

In some examples, the environment is visually scanned in order to identify the gaming device. In other examples, the gaming device can be identified via a communications network, e.g. via a wireless communications network such as Wi-Fi or Bluetooth. In other examples, a location of the gaming device may be retrieved from a memory. Identification can also be achieved by a combination of the above examples.

The environment to be visually scanned, in an example where scanning is used to identify the gaming device, is the real-world environment. Scanning comprises traversing surfaces with a beam (e.g. an electromagnetic beam) to detect features in the range of the beam, the features relating to articles of the environment such as objects including walls, floors, ceilings, tables, chairs, etc. Scanning provides the system with physical information of the local environment of a user to determine one or more locations to display a virtual image to be part of the mixed-reality experience.

Scanning is performed by one or more scanning devices or sensors configured to provide the relevant information concerning the local environment of a user. In some examples, scanners or sensors may include a visual device, such as a lens or a camera and/or other sensors. The scanning devices may form part of a virtual-reality headset which the user wears to facilitate displaying the augmented reality environment. The scan may be performed in 360 degrees around a user, for example as a user moves around the real-world environment. For example, where the mixed-reality display device is a head mountable display (HMD), the lens which tracks the input device may be through a camera mounted on or integral to the HMD and worn on the user's head. In other examples, the input device may be tracked from a camera mounted on a display device such as a monitor or television screen.

Figure 4:
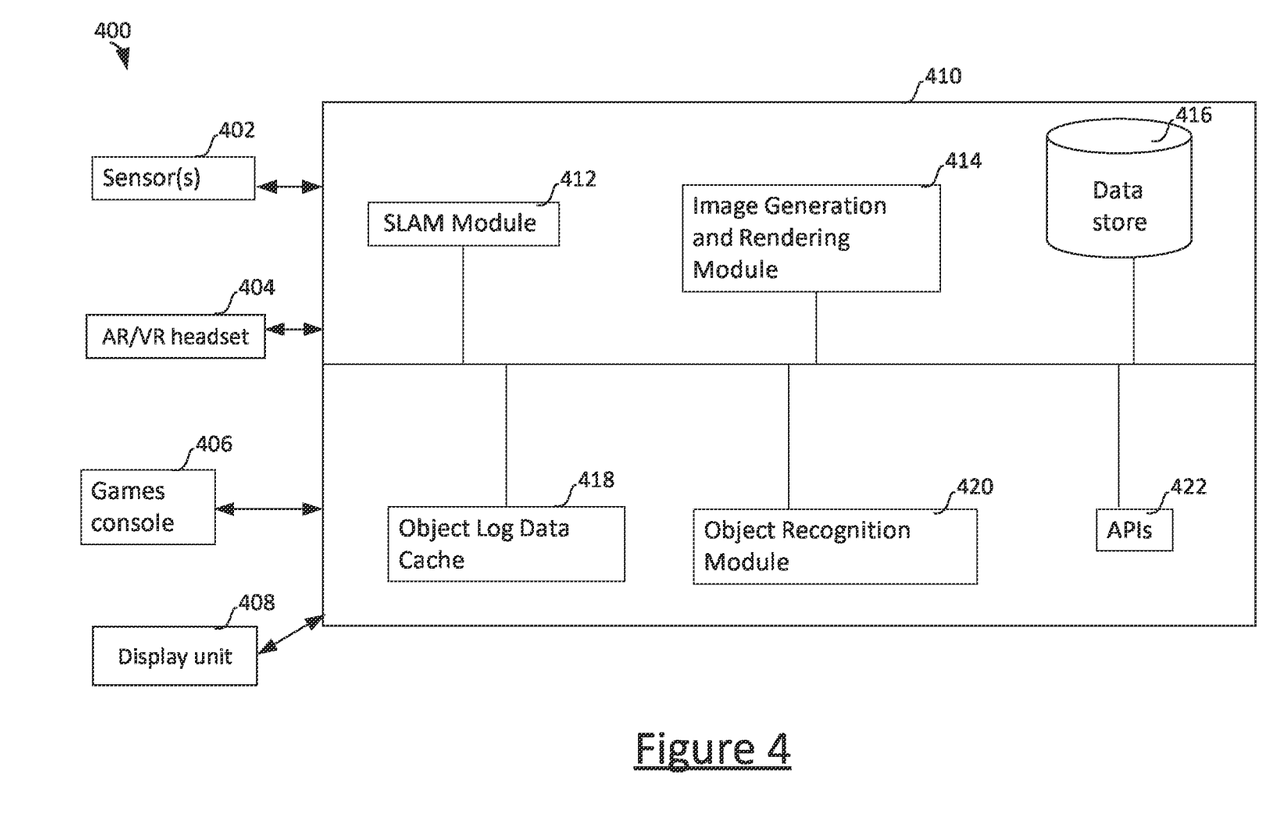
FIG. 4 illustrates an example system arranged to implement the present disclosure.
Figure 7:
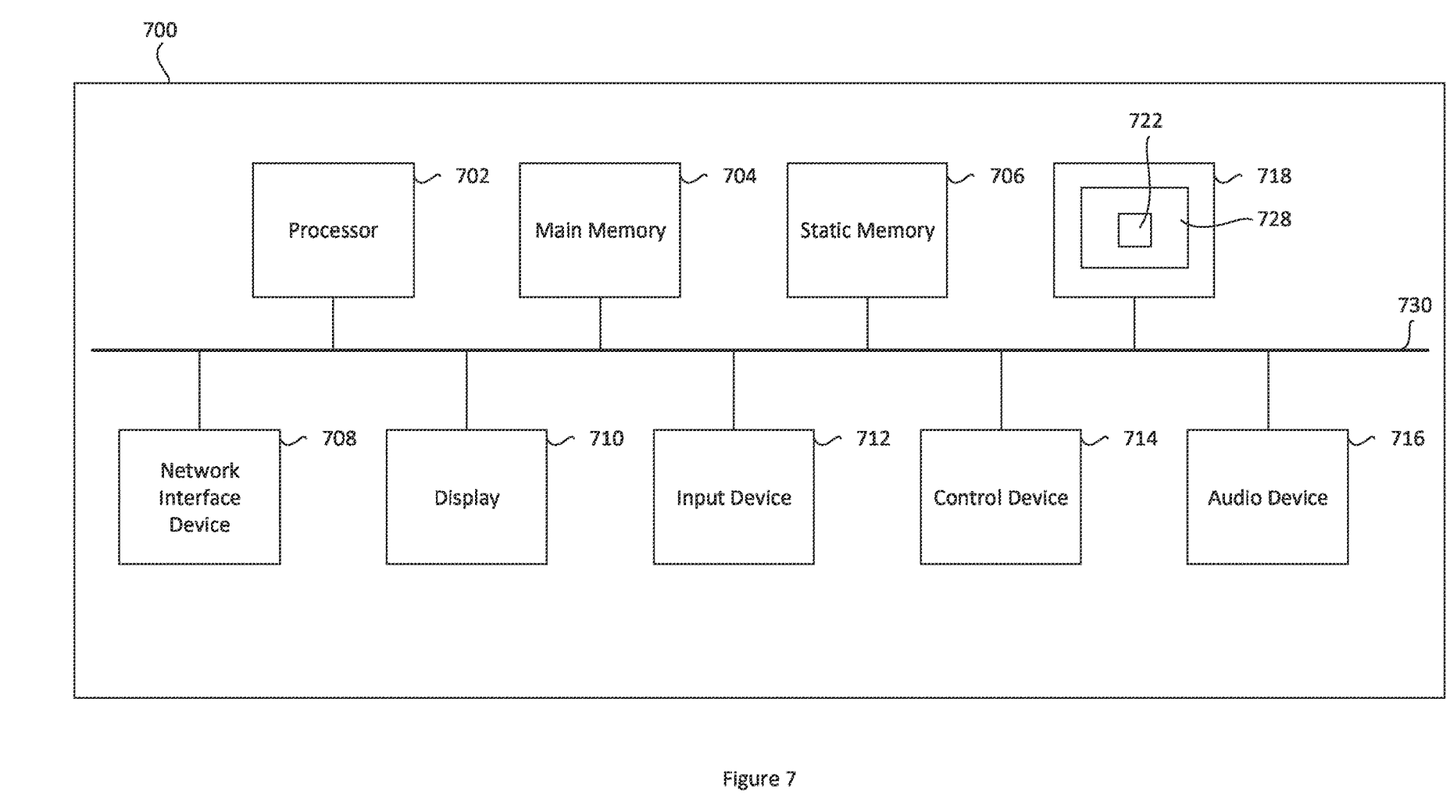
FIG. 7 illustrates a block diagram of one example implementation of a computing device.

In some examples, information measured by the scan can be received at a virtual reality headset. In other examples, this data may be relayed to a central processor. In a multi-user environment, centrally processing data may be preferable such that comparative data analysis can be performed. Scan information may include camera data and/or sensor data comprising accelerometers and/or gyroscopes of the one or more devices used in the scanning system. Processing of the scan information may be performed at a processor which is part of central processing system such as a computing device, for example as illustrated in FIGS. 4 and 7. In other examples, tracking information can be received from one or more external sources, such as a computing device. For example, tracking information can be received by edge computing where an external camera handles the tracking information with dedicated hardware.

In some examples, identifying the gaming console may be achieved by recognition using a trained neural network such as a dedicated Simultaneous Location and Mapping (SLAM) toolkit configured to provide information about the local physical space. A SLAM module may be provided by the system which implements the described method. SLAM is the computational problem of constructing or updating a map of an unknown environment while simultaneously keeping track of a user's location within the environment. There are several algorithms known for solving it, at least approximately, in tractable time for certain environments. Approximate solution methods include the particle filter, extended Kalman filter, covariance intersection, and GraphSLAM. SLAM algorithms are based on concepts in computational geometry and computer vision, and can be used for virtual reality or augmented reality.

The application of an artificial neural network (ANN) or a convolutional neural network (CNN), which is trained (e.g. in the context of SLAM), can determine that an object identified in the environment is a gaming device with high probability. ANNs can be hardware—(neurons are represented by physical components) or software-based (computer models) and can use a variety of topologies and learning algorithms. ANNs usually have at least three layers that are interconnected. The first layer consists of input neurons. Those neurons send data on to the second layer, referred to a hidden layer which implements a function and which in turn sends the output neurons to the third layer. There may be a plurality of hidden layers in the ANN. With respect to the number of neurons in the input layer, this parameter is based on training data.

The second or hidden layer in a neural network implements one or more functions. For example, the function or functions may each compute a linear transformation or a classification of the previous layer or compute logical functions. For instance, considering that the input vector can be represented as x, the hidden layer functions as h and the output as y, then the ANN may be understood as implementing a function $f$ using the second or hidden layer that maps from x to h and another function g that maps from h to y. So the hidden layer's activation is $f(x)$ and the output of the network is $g(f(x))$.

CNNs can also be hardware or software based and can also use a variety of topologies and learning algorithms. A CNN usually comprises at least one convolutional layer where a feature map is generated by the application of a kernel matrix to an input image. This is followed by at least one pooling layer and a fully connected layer, which deploys a multilayer perceptron which comprises at least an input layer, at least one hidden layer and an output layer. The at least one hidden layer applies weights to the output of the pooling layer to determine an output prediction.

Either of the ANN or CNN may be trained using images of physical objects which may be identified or need to be identified in accordance with the method such as screens, tables, chairs and other household items that might be part of the environment (e.g. a game environment). The training may be implemented using feedforward and backpropagation techniques.

A SLAM module may determine the presence of the gaming device in the physical environment in which the augmented reality environment is initialised and may use a convolutional neural network on the captured image data to identify the object as a particular type of object, such as a gaming device or other device. An object recognition module, which may be part of the system, can obtain and/or store coordinates of the gaming device from data output of a SLAM module.

This can be used to determine the location in the physical environment in which the augmented reality environment has been initialised. An object log data cache can be updated to include the identified gaming device for future reference. Other data concerning the gaming device can also be stored in a data store (e.g. memory). A position of the gaming device (and/or other objects) can be tracked relative to an augmented reality headset worn by a user by using locational information of the gaming device and the headset.

The gaming device can be identified via a communications network in some embodiments. For example, an automatic connection (e.g. via Wi-Fi or Bluetooth™) may be made between a gaming device and a user when the user enters the environment. Information (e.g. data) may be exchanged, for example via messages between the gaming device, the user (having an AR/VR headset) and the system or any combination of these devices. The information can locate the gaming device relative to one or more other devices with which it communicates.

In some examples, a location of the gaming device may be retrieved from a memory of the system for example based on device history etc. A check may need to be performed to determine that the gaming device is at the stored and retrieved location. This could be complemented by a visual scan or communication with the gaming device over a communications network.

According to a second step 120, an object, such as a further device, is identified in proximity (e.g. close proximity) to the gaming device. In a multi-user experience, the same or different types of objects may be identified by each user. The object can be a plane, where a plane is a substantially flat (e.g. planar) surface and which can be defined horizontally or vertically. A type of plane describes the type of surface e.g. a classification of the plane, which may for example be a table, a chair, a floor, a wall, a screen etc. In some embodiments, the object may be a further gaming device such as a screen, a gaming chair, or a gaming table to name a few examples. The object may be identified using a trained model such as SLAM and/or machine learning based techniques as described in more detail above in relation to the identification of the gaming device. In some examples, the object can be placed or replaced as assisted by user input, for example as the user interacts with planes by actively selecting them once they have been identified.

SLAM can be used in some examples to detect planes and types of plane which are two dimensional (2D) in the real-world environment local to a user. As the environment is scanned, the system can optionally label the different planes as they are detected, for example indicating that a plane is a tabletop, wall, further gaming device, etc. In some examples, plane/device information may be displayed via a virtual image in the augmented reality display to provide data concerning types of plane to a user. In some examples, locations of objects (real or virtual) or planes in the environment may be stored in a memory of the system for future reference.

As planes are detected they can be analysed. A proximity to the gaming device may be measured or otherwise determined. In providing an experience to the user, simply detecting planes to be part of their experience may not be adequate in that the planes may be too far away from the user or the gaming device to be useful. Determining that the planes are close to the gaming area is helpful in establishing an ease of use for the user. For example, determining that a detected object is in the same room as the user and/or the gaming device can be beneficial.

Other analysis can include determining whether an object (or plane) that has been identified is a further gaming device such as a gaming table, a gaming seat, a further monitor, and/or a computing device.

Whilst the virtual part of the mixed-reality location may not be scanned as such, knowledge about virtual objects and their placements in the context of the real-world part of the environment may be also be known and taken into account by the system.

In a multi-user example, constraints may be placed on the identification of the further device to maintain similarity of experience between each of the users. Constraints may relate to distances from the gaming device, planar requirements, types of device, etc.

According to a third step 130, an activity is initiated relating to the identified object or objects in a multi-user environment. The activity may be a virtual activity, specifically generation of an image (or an image stream) based on the identification of the object. The image or image stream may be displayed on and/or around the identified object.

In some examples, the activity provides semantic information which includes displaying a virtual image containing the semantic information to the user. In some examples this may comprise a visual aid in the form of a virtual image that is presented to the user to indicate objects as potential places to play a game or see a virtual image as the user scans and sees the environment. In one example, an object or device may appear highlighted in green if it is a gaming device or red if it is another plane that is not a gaming device. In other examples, an image stream may be generated that interacts with the identified object.

In some examples, the activity comprises initiating a spawning process, for example if the identified object is a further gaming device. A spawning process in computing refers to a function that loads and executes a new child process. The current process may execute concurrently with the child process or may wait for the child process to terminate before continuing. The child process in the context of the present disclosure may include generating an image to be displayed in the mixed-reality environment. The activity may also comprise placing a virtual object on the identified object/further device as part of a game experience.

In other examples, the activity comprises providing a consistent virtual experience between multiple users. More detailed information is provided below in relation to FIG. 2.

The activity may be initiated if the proximity between the gaming device and the other identified object is below a predetermined threshold distance. The system may only include the object/further device in the gaming environment of the user if they are relatively close together to improve user experience and interaction with the virtual-part of the mixed-reality environment. A distance threshold between the gaming device and the object may be up to 10 meters away from each other, or up to 5 meters away from each other in a preferred embodiment, for example between about 3 and 4 meters away. In some cases, the system may ensure that the distance between the object and the gaming device meets the requirements of a predetermined threshold and is in the same room as the gaming device.

The object can be replaced or assisted by user input, for example as the user interacts with planes in the mixed-reality environment. The maximum range of placing the virtual object may be limited by the initial process of detection and identification of the hardware. Once detected and identified, minimum, maximum and ideal distance values of the distance threshold may be determined, for example based on the object to be placed. Interaction with virtual elements can happen at any distance.

Figure 2:
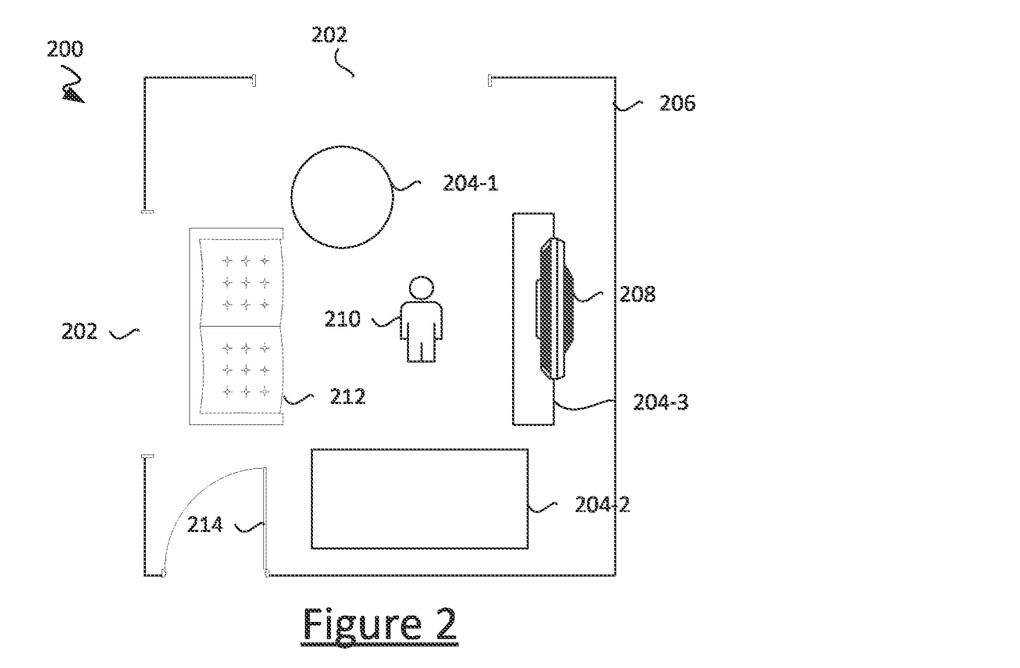
FIG. 2 illustrates a schematic diagram of an example environment within which the present disclosure could be used.

FIG. 2 illustrates an environment 200 in which the present disclosure could be used. The illustrated environment comprises windows 202, walls 206, a door 214, a chair or sofa 212, tables 204-1, 204-2, 204-3 a television or display unit 208 and a user 210. Also present but not illustrated is a computing device or system comprising a processor and memory.

The user 210 wears an augmented reality (AR) headset (also called a virtual reality (VR) headset) which is in communication with a computing device (e.g a gaming device). The AR/VR headset comprises a display unit and optionally one or more scanning devices, such as a camera, and is configured to display a virtual image to the user. The image to be displayed to the user may include one or more virtual objects (an interactive virtual image often displayed in a 3D manner). In a mixed-reality setting virtual image(s) are displayed on top of, or in combination with, the real-world environment of the user such that they appear to be part of the environment around the user that is wearing the headset.

As the user 210 moves about the environment 200, the AR/VR headset scans the environment with one or more scanning device(s). As the scanning takes place, the system detects planes, including those of the tables 204-1, 204-2, 204-3, chair 212 and walls 206. In some examples, scanning may be a continuous process, whilst in other examples, scanning may be performed at intervals. Information measured by the scanning can be stored at a memory of the system, for example to reduce the amount of scanning performed by the system.

The system may first identify a gaming device within the environment 200, followed by a plane in proximity to the gaming device. The gaming device in the example of FIG. 2 may be the display unit 208 and a further plane in proximity to the gaming device may be one of the tables 204-1, 204-2, 204-3. By first identifying the gaming device, the user experience can be anchored to be in proximity to the gaming device. Activities (e.g. virtual image generation) relating to the plane identified in the method may be initiated in determination that the proximity of the plane to the gaming device satisfies one or more conditions as described above.

In some embodiments there may be more than one user (e.g. player) in more than one environment, for example in a multi-user or multi-player game. Consistency can be maintained between users by determining the space available to each user and adapting the experience accordingly. For example, some users may have an environment which is similar to that of FIG. 2 but which is on a larger/smaller scale, some environments may not have tables 204-1, 204-2, 204-3, may have additional features, or differing amounts of floor space etc.

A comparison can be made based on users differing available space in the real-world environment by data collected at (e.g. sent to) a central processor. This comparison could be performed by comparing numbers of planes scanned in the environment, plane sizes, or other volumetric data received, for example through scanning and historical data of the users local environment.

After a comparison has been made, a determination can be made about which space is the most restricted of all the users since this will provide limitations of size, scale and location placements of virtual objects if they are each to share the same experience. Virtual objects to be placed in the virtual part of the mixed-reality environment may be scaled according to the most restricted of the users' available areas. This helps to ensure that the users all have a similar experience, for example by interacting with identical virtual objects. Calculations to determine a suitable size, scale and location of virtual objects, for example to be displayed on a particular type of plane) may take into consideration a level of interaction between the user and the virtual object (e.g. if it for observation only or whether the user interacts physically with the virtual object, etc.) to maintain the integrity of the intended interaction between the user and the virtual object.

In some examples, depending on the object to be placed and any conditions associated therewith, a wall may be specified as a useable space if no tabletop space is available for one of the users. Further constraints may limit the amount by which an object can be scaled, for example if interaction with the virtual object is through using a hand (i.e. the scale should not be so small that a human hand could no longer interact with the mixed-reality experience in the intended way).

Figure 3A:
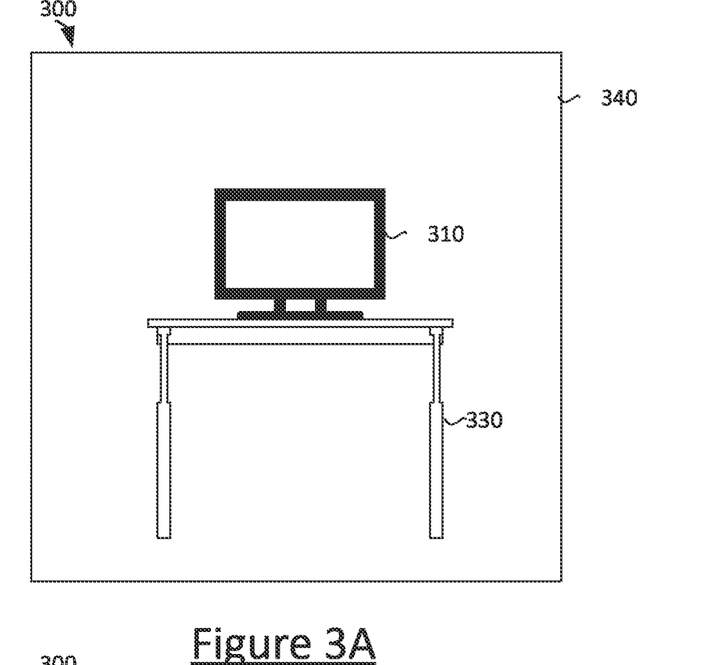
FIGS. 3A and 3B illustrates a virtual object in a bounding box.

FIG. 3A illustrates a view of a real-world part of an environment 300. For example, as seen by a user (or multiple users) of the augmented reality system without a virtual-part. The real-world part of the environment 300 comprises a screen 310, a table 330 and a wall 340.

Figure 3B:
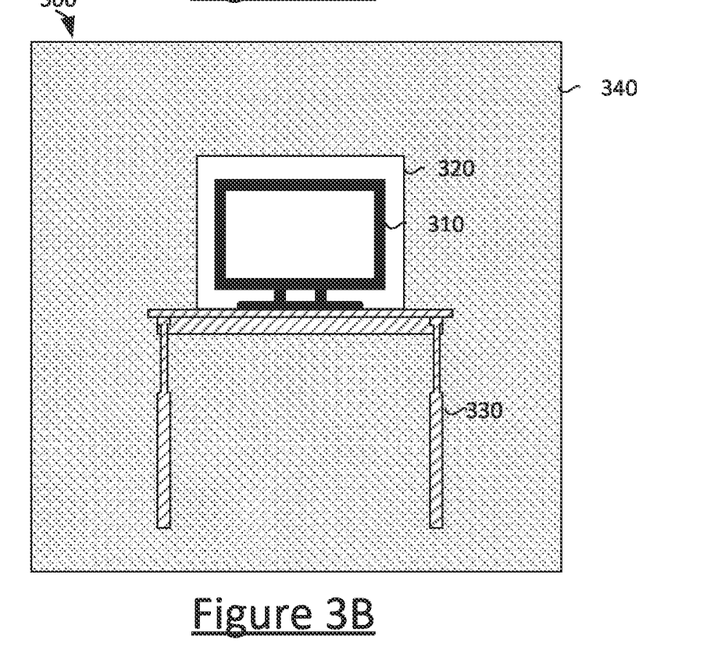

FIG. 3B illustrates an augmented view of the mixed-reality environment 300. The view illustrated in FIG. 3B has the same components of the real-world part of the environment 300 of FIG. 3A further comprising image overlays provided in the virtual-part of the mixed-reality setting.

According to an embodiment of the present disclosure, the method comprises classifying the items within the environment 300 and indicating these classifications, for example visually by displaying a virtual image (e.g. image overlay) in the virtual part of the mixed-reality environment 300 which indicates to the user the different objects. In the example of FIG. 3B, the screen 310 is highlighted to the user by displaying an image 320 over and around the screen 310. The table 330 and the wall 340 are highlighted as different objects. In other examples, the objects present in the environment 300 may be presented differently to the user, for example using text or other visual aids. The images or image overlays do not obscure the real-world features of the environment but can help to identify or classify them. Selecting further playing surfaces may be performed automatically as a result of the classification process, or can be selected by a user in other examples.

FIG. 4 illustrates a schematic diagram of an example system 400 which can implement the present disclosure. The system 400 comprises modules suitable for mapping and classifying the local environment and rendering an image to be displayed to a user. The system comprises sensor(s) 402, an AR/VR headset, a games console 406, a display unit 408 and a processing unit 410. The processing unit 410 comprises a SLAM module 412, an image generation and rendering module 414, a data store 416 (e.g. a memory), an object log data cache 418, an object recognition module 420 and an API module 422.

Sensor(s) 402 may comprise one or more of a camera, an accelerometer, a gyroscope, a global positioning sensor, a light sensor and/or a depth sensor, each configured to capture data from the environment. In some examples, the sensor(s) 402 may be part of the VR/AR headset 404 worn by a user. The AR/VR headset 404 may also include the display unit 408 in some examples.

The sensor(s) 402, AR/VR headset 404, games console 406 and display unit 408 are in communication with the processing unit 410. The processing unit 410 may be located in the cloud or be a part of the games console 406 or other computing device. Any suitable communications network can be used to transmit data between the sensor(s) 402, AR/VR headset 404, games console 406, display unit 408 and processing unit 410.

The processing unit 410 comprises a SLAM module. The SLAM module 412 provides an estimate of the surrounding environment and comprises an internal front end which performs feature extraction of the captured sensor data (e.g. with data received from sensor(s) 402 for example as described in relation to FIG. 1. This may include object/device identification using landmarking techniques which may be used to identify key map points on objects inside the surrounding environment. The SLAM module 412 further comprises an internal back end which uses the data output from the internal front end to determine the relationships between different frames, localization of a camera, geometrically reconstructing the surrounding environment as captured by the sensor(s) 402. An internal output module provides output data indicative of the surrounding environment, including data for the physical objects in the surrounding environment, the locations of those objects and landmark data corresponding to landmarks on those objects. The SLAM module 412 may feed directly into the object recognition module 420, which recognises planes including surfaces relating to, for example, tabletops, floors, walls etc. Data concerning the objects which are identified in the environment may be stored at the data store 416 and/or object log data cache 418, for example their location or type of object.

The image generation and rendering module 414 may create image content to be displayed at the AR/VR headset 404 and/or display unit 408 to be seen by a user. This can be based on data received from the sensor(s) 402 and/or one or more outputs from the SLAM module 412 and/or object recognition module 420 in response to detecting a plane or object in an environment. Image data may be created dynamically (or statically) at the image generation and rendering module 414 and provided as an image stream (or image) to a display output of the system. The image provides the virtual-part of the mixed-reality environment whilst the user sees the real-world part of the environment through one or more lenses of the AR/VR headset.

The API module 422 may create or run one or more applications to be presented on a display device such as display unit 408.

The system 400 is implemented using any suitable processing resource, which may be hardware and/or software implemented.

Figure 5:
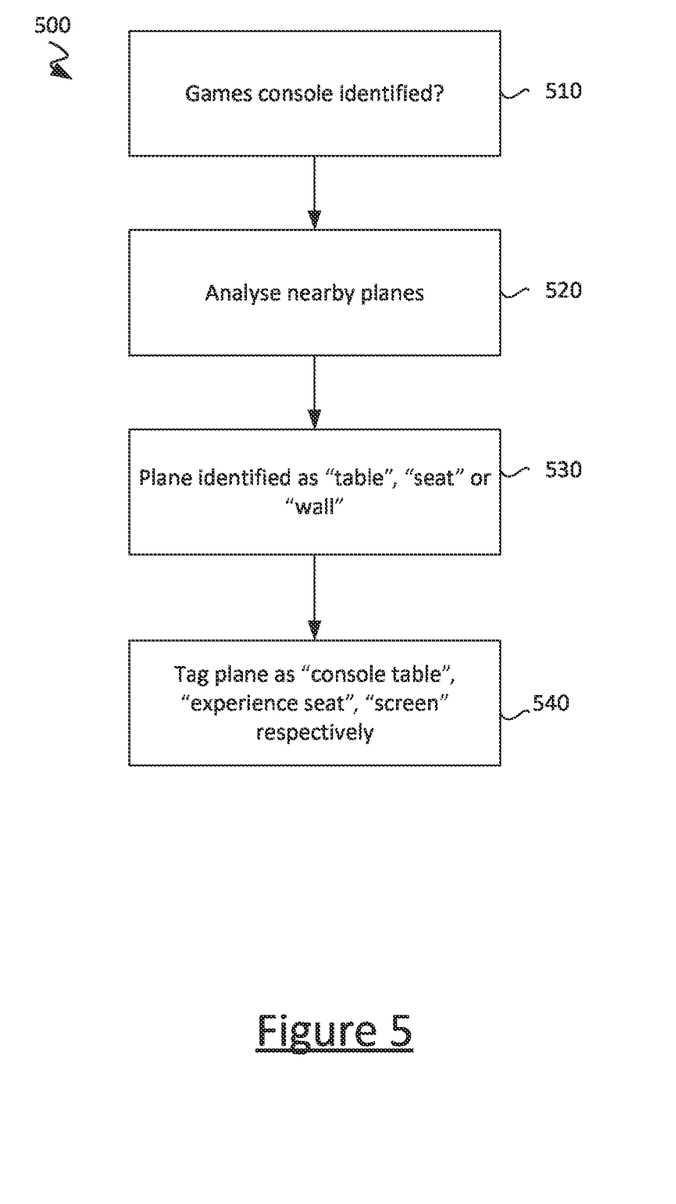
FIG. 5 illustrates a flow diagram of a method according to an embodiment of the present disclosure.

FIG. 5 illustrates a flow diagram of a method 500 according to the present disclosure.

According to a first step 510, a games console is identified. The games console may be a PlayStation™ or any other computing device such as a computer, mobile telephone, tablet or other device. Identifying the games console first allows the user experience to be grounded in an area proximate to the games console.

In a second step 520, nearby planes are analysed. Analysis may comprise determining a type of object that is being seen through a VR/AR headset.

In a third step 530, planes are identified. A plane may be identified as an object such as a table, a seat, a wall etc. For example, a plane might be identified as a table underneath the games console. In another example, a seat close to the games console might be identified. In a further example, a wall close to the games console can be identified.

In a fourth step 540, the system tags the planes/objects. In some examples, the system determines whether a detected object is a further gaming device such as a gaming seat or gaming table and tags these planes accordingly.

Steps one to four may be completed in parallel in a multi-user example, for example at each user device.

The method 500 provides semantic details to a user and assists the user in placing virtual objects. This can improve ease of use and overall user experience in the mixed-reality setting.

Figure 6:
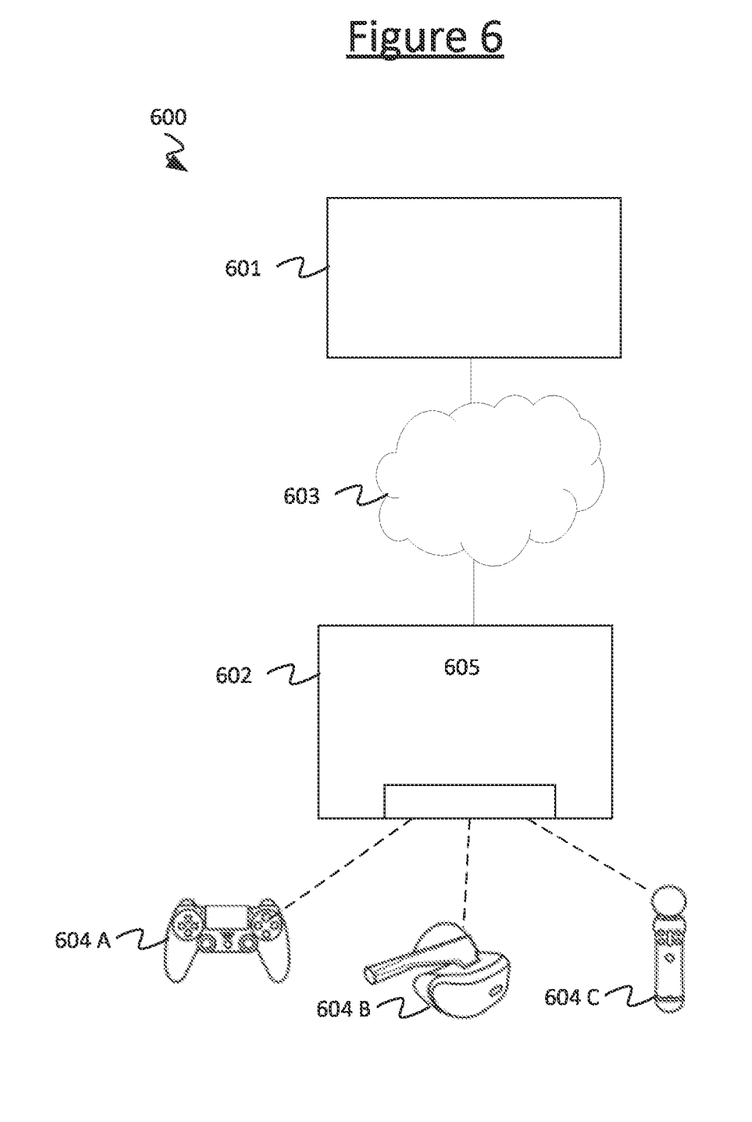
FIG. 6 shows schematically an example of a cloud gaming system that may be used in accordance with the present disclosure.

FIG. 6 shows schematically an example of a cloud gaming system 600 that may be used in accordance with the present disclosure. In FIG. 6, the cloud gaming system 600 is shown as comprising a server 601 that is in communication with a client device 602 (e.g. a screen) via a communications network 603. The server 601 may be configured to perform at least some of the rendering of an image as described above.

The client device 602 may include, e.g. a video game playing device (games console), a smart TV, a set-top box, a smartphone, laptop, personal computer (PC), USB-streaming device (e.g. Chromecast), etc. The client device 602 may receive e.g. video frames from the server 601, via the communications network 603. In some examples, the client device 601 may receive image data from the server 601 and perform further processing on that image data. The image data may comprise instructions about a virtual object and/or the conditions associated with that virtual object. The client device further comprises a VR/AR headset for displaying the mixed-reality to a user.

In FIG. 6, the client device 602 is shown as being associated with a plurality of input devices 604A (DualShock 4 ®), 604B (PS VR® headset), 604C (PS Move® Controller). It will be appreciated that the input devices 604A, 604B, 604C shown are merely illustrative examples and that a different number of, and/or different types of input devices may be provided. The input devices are in communication with the client device via a wired or wireless connection. In FIG. 6, the client device 602 is shown as comprising a communication interface 605 for receiving user inputs generated at or via the input devices. It will be further appreciated that in some examples, user inputs may be generated at the client device 602 and not necessarily with a separate, standalone input device. For example, if the client device 602 is e.g. a smartphone or table with a touchscreen.

FIG. 7 illustrates a block diagram of one example implementation of a computing device 700 that can be used for implementing the steps indicated in FIG. 1 and explained throughout the detailed description. The computing device is associated with executable instructions for causing the computing device to perform any one or more of the methodologies discussed herein. The computing device 700 may operate in the capacity of the data model or one or more computing resources for implementing the data model for carrying out the methods of the present disclosure. In alternative implementations, the computing device 700 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random-access memory (DRAM) such as synchronous DRAM (SDRAM) or Rambus DRAM (RDRAM), etc.), a static memory 706 (e.g., flash memory, static random-access memory (SRAM), etc.), and a secondary memory (e.g., a data storage device 718), which communicate with each other via a bus 730.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 722) for performing the operations and steps discussed herein.

The computing device 700 may further include a network interface device 708. The computing device 700 also may include a video display unit 710 (e.g., a light emitting diode (LED) display, a liquid crystal display (LCD) or a cathode ray tube (CRT)), an alphanumeric input device 712 (e.g., a keyboard or touchscreen), a cursor control device 714 (e.g., a mouse or touchscreen), and an audio device 716 (e.g., a speaker).

The data storage device 718 may include one or more machine-readable storage media (or more specifically one or more non-transitory computer-readable storage media) 728 on which is stored one or more sets of instructions 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilising terms such as "providing", "calculating", "computing," "identifying", "detecting", "establishing", "training", "determining", "storing", "generating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the disclosure has been described with reference to specific example implementations, it will be recognised that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer-implemented method comprising:
    identifying a first gaming device in a first real-world environment, the first gaming device providing a first user experience to a first user in a first mixed-reality setting;
    identifying a first object in the first real-world environment in proximity to the first gaming device;
    generating a first image to be displayed to the first user relating to the first object based on a virtual part of the first mixed-reality setting;
    identifying a second gaming device in a second real-world environment, the second gaming device providing a second user experience to a second user in a second mixed-reality setting;
    identifying a second object in the second real-world environment in proximity to the second gaming device;
    comparing the first and second real-world environments;
    generating a second image to be displayed to the second user relating to the second object in the virtual part of the second mixed-reality setting based on the comparing; and
    initiating an activity relating to the first and second objects based on the comparing in a consistent manner between the first and second user experiences.

2. The computer-implemented method of claim 1, wherein the activity comprises a spawning process.

3. The computer-implemented method of claim 1, further comprising initiating the activity if the proximity of the object to the gaming device is below a predetermined threshold.

4. The computer-implemented method of claim 3, wherein the predetermined threshold is less than 10 meters.

5. The computer-implemented method of claim 1, wherein generating the image to be displayed to one of the first user is initiated if the object is in a same room of a building as the first gaming device.

6. The computer-implemented method of claim 1, wherein the object is another gaming device, different from the first gaming device and the second gaming device.

7. The computer-implemented method of claim 1, wherein identifying at least one of the first gaming device and the first object is based on scanning the first real-world environment.

8. The computer-implemented method of claim 7, wherein scanning the first real-world environment further comprises determining planes using simultaneous location and mapping (SLAM).

9. The computer-implemented method of any claim 8, wherein scanning performed through a camera on a headset of the first user.

10. The computer-implemented method of claim 1, wherein identifying at least one of the first gaming device and the first object comprises using at least one of a trained artificial neural network (ANN), and a convolutional neural network (CNN).

11. The computer-implemented method of claim 1, wherein identifying comprises receiving information concerning at least one of the first gaming device, the second gaming device, the first object, and the second object via a communications network.

12. The computer-implemented method of claim 11, wherein the information is received at a headset of at least one of the first user, the second user, the first gaming device, and the second gaming device.

13. The computer-implemented method of claim 1, wherein at least one of the first gaming device and the second gaming device is at least one of a screen and a games console.

14. The computer-implemented method of claim 1, further comprising storing at least one of location and position information relating to the first gaming device.

15. The computer-implemented method of claim 1, further comprising indicating at least one of the first gaming device and the first object to the first user via a display device.

16. A non-transitory computer-readable media storing computer-executable instructions which, when executed by one or more processors of a computer system, causes the one or more processors to perform operations comprising:
- identifying a first gaming device in a first real-world environment, the gaming device providing a first user experience to a first user in a first mixed-reality setting;
- identifying a first object in the first real-world environment in proximity to the first gaming device;
- generating a first image to be displayed to the first user relating to the first object based on a virtual part of the first mixed-reality setting;
- identifying a second gaming device in a second real-world environment, the second gaming device providing a second user experience to a second user in a second mixed-reality setting;
- identifying a second object in the second real-world environment in proximity to the second gaming device;
- comparing the first and second real-world environments;
- generating a second image to be displayed to the second user relating to the second object in the virtual part of the second mixed-reality setting based on the comparing; and
- initiating an activity relating to the first and second objects based on the comparing in a consistent manner between the first and second user experiences.

17. A system comprising:
a mixed-reality display device;
a gaming device or computing device comprising a processor and memory, wherein the gaming device and the mixed-reality display device are operably connected by a communication network, and
wherein the system is arranged and configured to carry out a method comprising:
- identifying a first gaming device in a first real-world environment, the first gaming device providing a first user experience to a first user in a first mixed-reality setting;
- identifying a first object in the first real-world environment in proximity to the first gaming device; and
- generating a first image to be displayed to the first user relating to the first object based on a virtual part of the first mixed-reality setting;
- identifying a second gaming device in a second real-world environment, the second gaming device providing a second user experience to a second user in a second mixed-reality setting;
- identifying a second object in the second real-world environment in proximity to the second gaming device;
- comparing the first and second real-world environments;
- generating a second image to be displayed to the second user relating to the second object in the virtual part of the second mixed-reality setting based on the comparing; and
- initiating an activity relating to the first and second objects based on the comparing in a consistent manner between the first and second user experiences.

18. The system of claim 17, wherein:
the first gaming device is a TV, a computer monitor or a games console; and/or
the mixed-reality display device is an Augmented Reality, AR, headset.

* * * * *